United States Patent [19]
Häberle et al.

[11] 4,231,601
[45] Nov. 4, 1980

[54] BUMPER FOR MOTOR VEHICLES
[75] Inventors: Fritz Häberle; Daniel Riechers, both of Sindelfingen; Richard Heusel, Tübingen, all of Fed. Rep. of Germany
[73] Assignee: Daimler-Benz Aktiengesellschaft, Fed. Rep. of Germany
[21] Appl. No.: 909,001
[22] Filed: May 24, 1978
[30] Foreign Application Priority Data
May 27, 1977 [DE] Fed. Rep. of Germany ....... 2724016
[51] Int. Cl.³ .............................................. B60R 19/04
[52] U.S. Cl. .................................................. 293/136
[58] Field of Search ............... 293/102, 150, 149, 134, 293/136, 126
[56] References Cited
U.S. PATENT DOCUMENTS
3,861,728  1/1975  Haberle et al. ...................... 293/136
3,907,351  9/1975  Pozelt et al. .......................... 293/136

Primary Examiner—Richard A. Bertsch
Attorney, Agent, or Firm—Craig & Antonelli

[57] ABSTRACT

A bumper for motor vehicles which is displaced in the vehicle longitudinal direction in case of an impact and which is provided with end portions laterally drawn about the vehicle, rigidly connected with the bumper center portion and extending approximately parallel to the vehicle outer surfaces. For purposes of longitudinally guiding the end portions at a distance from the vehicle outer surface, mounting brackets are rigidly connected to each end portion and have free which engage guide members projecting from the vehicle outer surface. A support part of each end portion terminates at a distance from an associated wheel casing cutout and includes on its top side a cover member rigidly connected to the end portion and the remaining area of the end portion is covered by a downwardly projecting apron. In case of a unilateral yielding of the bumper, the apron at first engages a deflection edge of the guide member and then is guided along the same past the wheel while being bent.

10 Claims, 5 Drawing Figures

BUMPER FOR MOTOR VEHICLES

The present invention relates to a bumper for motor vehicles, especially for passenger motor vehicles, which in case of an impact is displaced preferably in the vehicle longitudinal direction and which is provided with end portions laterally drawn about the vehicle, rigidly connected with the bumper center portion and extending approximately parallel to the vehicle outer surface, whereby the end portions are longitudinally displaceably guided at a distance from the vehicle outer surface, and whereby a mounting bracket having a cranked or offset shape is rigidly connected with the end portion and with its free end engages into a guide member projecting from the vehicle outer surface.

Such an arrangement entails the advantage that also in case of stronger impacts, the guidance of the lateral parts is preserved. However, it may happen in case of an eccentric or obliquely directed impact that the end portion collides with the associated wheel whereby the wheel, or also the end portion may be damaged.

It is the aim of the present invention to provide a means whereby a contact of the end portion of a bumper with a wheel is prevented in case of an impact.

Consequently, it is proposed according to the present invention with a bumper of the aforementioned type that the support part of the end portion terminates at a distance from the associated wheel casing cutout and includes on its top side a cover member rigidly connected with the support part, whereas its remaining area is covered by a downwardly projecting apron which, together with the cover member is extended up to the wheel casing cutout, whereby in case especially of a unilateral, inward movement of the bumper the apron which is displaced in the direction toward the wheel, at first runs up against and engages a deflection edge of the guide member and is then guided past the wheel while being bent.

Accordingly, it is an object of the present invention to provide a bumper for motor vehicles which avoids by simple means the aforementioned shortcomings and drawbacks encountered in the prior art.

Another object of the present invention resides in a longitudinally yielding bumper for motor vehicles which effectively precludes any damage to the bumper end portions and/or the wheels associated therewith in case of an eccentric or obliquely directed impact on the bumper causing the same to be displaced generally in the longitudinal direction.

A further object of the present invention resides in a bumper for motor vehicles which in case of an accident prevents a contact of the lateral bumper end portion with the associated wheel.

Still a further object of the present invention resides in a bumper which yields in the longitudinal direction of the vehicle toward the center of the vehicle under the force of an impact, yet is so constructed by extremely simple means as to avoid damage to any other parts of the vehicle, particularly the wheels and tires thereof.

These and further objects, features and advantages of the present invention will become more apparent from the following description when taken in connection with the accompanying drawing which shows, for purposes of illustration only, one embodiment in accordance with the present invention, and wherein.

Figure 1:
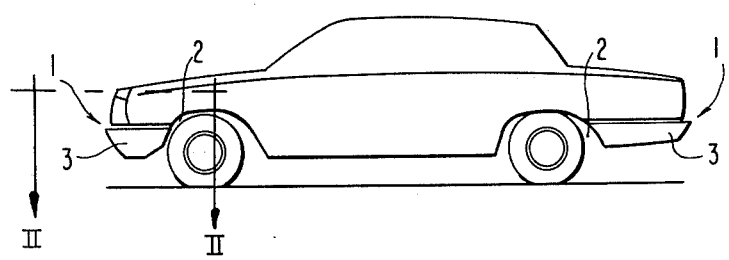
FIG. 1 is a schematic side elevational view of a motor vehicle equipped with bumper end portions drawn laterally about the vehicle.
Figure 2:
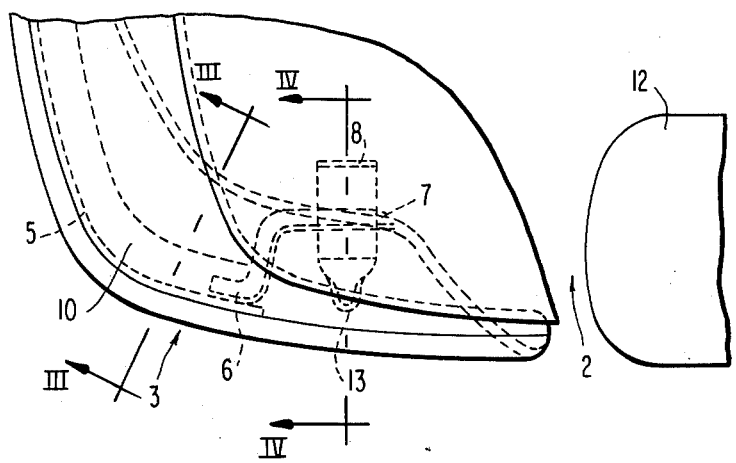
FIG. 2 is a partial simplified plan view of a vehicle front end portion equipped with a bumper in accordance with the present invention, taken along line II—II of FIG. 1.

Referring now to the drawing wherein like reference numerals are used throughout the various views to designate like parts, a passenger motor vehicle schematically illustrated in FIG. 1 includes a front bumper and a rear bumper generally designated by reference numeral 1 including each end portions 3 laterally drawn about the vehicle and extending up to the wheel casing cutouts 2. The end portions 3—as shown in particular in FIG. 4—are guided at a distance from the vehicle outer surface 4. As shown in FIG. 2, a curved mounting bracket 6 projects from a support part 5 of the end portion 3 of the bumper, and has a free end 7 which is guided by a guide member 8 fixed to the vehicle body (FIGS. 2 and 4).

Figure 3:
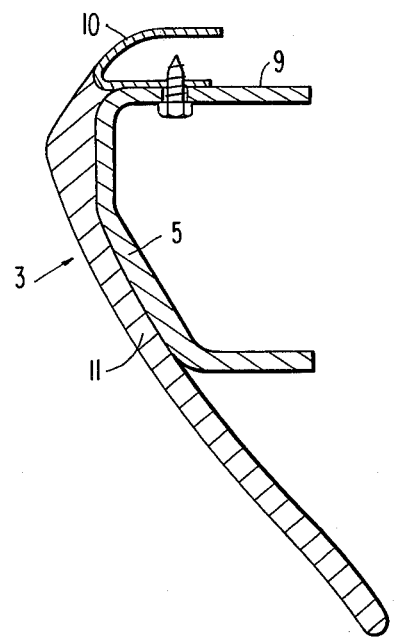
FIG. 3 is a cross-sectional view, on an enlarged scale, taken along line III—III of FIG. 2.

The support part 5 of the end portion 3 terminates in front of the wheel casing cutout 2 and according to FIG. 3 receives at its top side 9 a cover member 10, suitably secured thereto, whose forward continuation is formed by an apron 11 extending relatively far in the downward direction.

Figure 4:
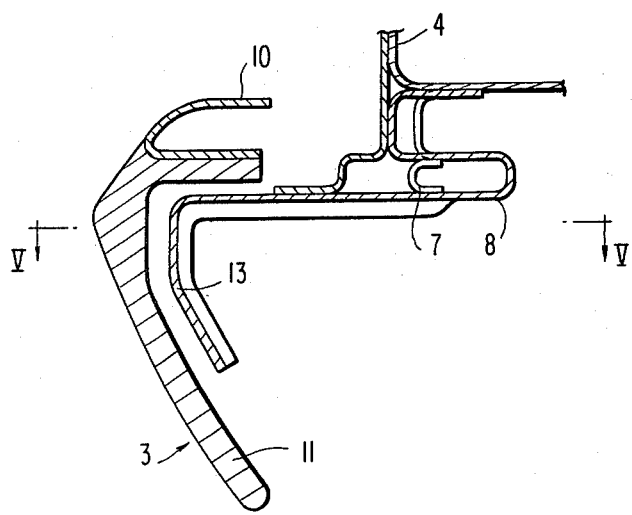
FIG. 4 is a cross-sectional view, on an enlarged scale, taken along line IV—IV of FIG. 2.
Figure 5:
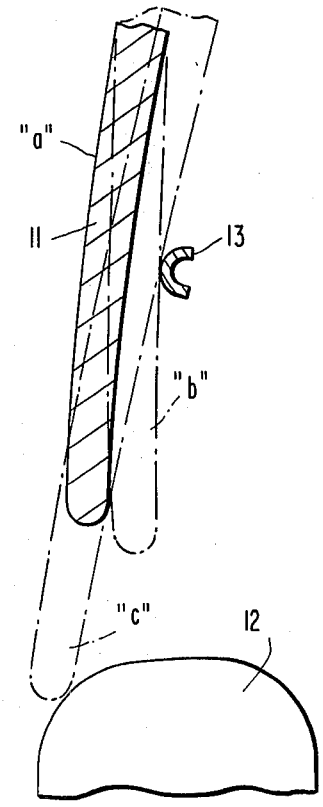
FIG. 5 is a horizontal cross-sectional view taken along line V—V of FIG. 4.

In order that the associated apron 11 is not damaged when running up against the wheel 12 in case of an inwardly yielding movement of the bumper 1, especially in case of a unilateral retraction of the bumper 1, the guide member 8 includes a deflection edge 13 which during normal driving operation has a certain distance from the apron 11 as is shown in FIGS. 4 and 5. With reference to FIG. 5, if, in contradistinction thereto, the apron 11 is displaced in the direction toward the wheel 12 in case of a unilateral or one-sided inward movement of the bumper 1, then a sequence takes place indicated by the reference characters "a", "b", and "c" whereby the apron in position "b" runs up against the deflection edge 13 and subsequently is deflected up to the end position indicated by reference character "c".

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A bumper for motor vehicles yieldable in case of an impact and including bumper end portions laterally drawn about the vehicle, rigidly connected with the bumper center portion and extending approximately parallel to the vehicle outer surface, said end portions of the bumper being longitudinally displaceably guided at a distance from the vehicle outer surface, and a mounting bracket means rigidly connected with a respective bumper end portion and projecting with its free end into a guide means fixed at the vehicle, characterized in that the respective end portion includes a support means terminating at a distance from an associated wheel casing cutout, said support means having at its top side a cover means rigidly connected with the end portion, and the remaining area of the end portion being covered off by a downwardly projecting apron means which together with the cover means extends up to at least near the wheel casing cutout.

2. A bumper for motor vehicles yieldable in case of an impact and including bumper end portions laterally drawn about the vehicle, rigidly connected with the bumper center portion and extending approximately parallel to the vehicle outer surface, said end portions of the bumper being longitudinally displaceably guided at a distance from the vehicle outer surface, and a mounting bracket means rigidly connected with a respective bumper end portion and projecting with its free end into a guide means fixed at the vehicle, characterized in that the respective end portion includes a support means terminating at a distance from an associated wheel casing cutout, said support means having at its top side a cover means rigidly connected with the end portion, and the remaining area of the end portion being covered off by a downwardly projecting apron means which together with the cover means extends up to at least near the wheel casing cutout, whereby in case of an inward movement of the bumper, the apron means which is displaced in the direction toward the wheel engages at first at a deflection edge of the guide means and is then guided past the wheel.

3. A bumper according to claim 2, characterized in that upon engagement of the apron means at the deflection edge of the guide means, the apron means is guided past the wheel while being bent off.

4. A bumper according to claim 1, 2 or 3, characterized in that the bumper is displaceable in the vehicle longitudinal direction.

5. A bumper according to claim 4, characterized in that the mounting bracket means has an essentially cranked shape.

6. A bumper according to claim 5, characterized in that the guide means projects from the outer surface of the vehicle.

7. A bumper according to claim 6, characterized in that the apron means engages at the deflection edge of the mounting means in case of a unilateral inward movement of the bumper.

8. A bumper according to claim 1, characterized in that the mounting bracket means has an essentially cranked shape.

9. A bumper according to claim 1, 2 or 3, characterized in that the guide means projects from the outer surface of the vehicle.

10. A bumper according to claim 1, 2 or 3, characterized in that the apron means engages at the deflection edge of the mounting means in case of a unilateral inward movement of the bumper.

* * * * *